United States Patent [19]
Richards et al.

[11] Patent Number: 6,027,257
[45] Date of Patent: Feb. 22, 2000

[54] PAN AND TILT UNIT

[75] Inventors: William G. Richards, Portsmouth, R.I.; Lawrence M. Honig, Newton; Joseph R. Pimenta, South Dartmouth, both of Mass.

[73] Assignee: Basic Telepresence Inc, Watertown, Mass.

[21] Appl. No.: 09/048,645

[22] Filed: Mar. 26, 1998

[51] Int. Cl.$^7$ ................................................ F16M 11/12
[52] U.S. Cl. .................. 396/428; 248/183.1; 248/186.2; 348/373; 352/243
[58] Field of Search ............................. 396/20, 419, 427, 396/428; 248/176.1, 176.3, 178.1, 183.1, 186.2, 274.1, 282.1, 283.1; 352/243; 348/373

[56] References Cited

U.S. PATENT DOCUMENTS

| | | | |
|---|---|---|---|
| 3,984,628 | 10/1976 | Sharp ........................................ | 178/6.8 |
| 4,123,782 | 10/1978 | Kitahara et al. ........................ | 358/210 |
| 4,244,006 | 1/1981 | Kitahara et al. ........................ | 358/210 |
| 4,280,135 | 7/1981 | Schlossberg ............................. | 358/93 |
| 4,310,136 | 1/1982 | Mooney .................................... | 248/278 |
| 4,566,036 | 1/1986 | Kadosawa ................................ | 358/210 |
| 4,655,567 | 4/1987 | Morley .................................... | 352/243 |
| 4,720,805 | 1/1988 | Vye ......................................... | 364/525 |
| 4,728,839 | 3/1988 | Coughlan et al. ...................... | 310/112 |
| 4,827,387 | 5/1989 | Ferren et al. ........................... | 362/284 |
| 4,890,713 | 1/1990 | Pagano ................................. | 192/142 R |
| 4,937,675 | 6/1990 | Starceski et al. ....................... | 358/229 |
| 4,945,459 | 7/1990 | Ferren et al. ........................... | 362/284 |
| 4,978,984 | 12/1990 | Brookfield ............................... | 354/81 |
| 5,204,573 | 4/1993 | Bederson et al. ....................... | 310/198 |
| 5,224,675 | 7/1993 | Ellenberger et al. ................... | 248/183 |
| 5,394,209 | 2/1995 | Stiepel et al. ............................ | 354/81 |
| 5,463,432 | 10/1995 | Kahn ...................................... | 352/243 |
| 5,479,203 | 12/1995 | Kawai et al. ............................ | 348/15 |

*Primary Examiner*—Safet Metjahic
*Assistant Examiner*—J. K. Han
*Attorney, Agent, or Firm*—Wolf, Greenfield & Sacks, P.C.

[57] ABSTRACT

A pan-tilt unit for positioning or aiming a device requiring motion control, such as a videoconferencing or surveillance camera. The pan-tilt unit includes a base, a rotatable pan platform and a rotatable tilt bed for supporting and selectively orienting the device in a desired direction. The pan platform is rotatably supported on the base about a pan axis, and the tilt bed is rotatably supported on the pan platform about a tilt axis that is transverse to the pan axis. A pan motor and a tilt motor drive the pan platform and the tilt bed in response to control signals that may be provided to the unit across a communication network. The motors may be mounted on the unit to remain stationary relative to the base during panning and tilting operations. The motors may be controlled to rotate in opposite directions to maintain the tilt bed at a fixed tilt angle as the pan platform is rotated about the pan axis. The unit may include a drive shaft rotatably supported along the pan axis to couple the drive motor to the tilt bed.

39 Claims, 8 Drawing Sheets

PAN AND TILT UNIT

BACKGROUND OF THE INVENTION

1. Field of the Invention

The present invention relates to a pan-tilt unit for positioning or aiming a device, such as a camera.

2. Description of Related Art

Pan-tilt units are used to position, aim, steer or otherwise orient a device in a desired direction by moving the device about two perpendicular axes. One common application is the field of surveillance and security where a camera is mounted to a pan-tilt unit that can be controlled or programmed to scan a desired area. Another application involving cameras is the field of videoconferencing where a video camera is mounted to a pan-tilt unit that can be controlled from a remote location to direct a camera toward a particular individual in a room.

Pan-tilt movement is conventionally accomplished using separate motors that independently perform the pan and tilt operations. For example, a pan-tilt unit generally includes a pan motor for rotating the device about a pan axis, and a tilt motor for rotating the device about a tilt axis that is perpendicular to the pan axis.

In known pan-tilt units, at least one of the drive motors is typically mounted to a structure that is rotated about one of the axes by the other motor. For example, the tilt motor in many pan-tilt units is mounted to a portion of the unit that is rotated about the pan axis by the pan motor as described in U.S. Pat. No. 5,463,432 to Kahn. In such configurations, the pan motor must be capable of delivering sufficient power to move the mass of the tilt motor and its accompanying drive mechanism. Consequently, the unit may require a pan motor that is larger than would otherwise be necessary if it did not have to physically move the mass of the tilt motor. The use of larger motors leads to a relatively heavier unit that consumes a higher amount of power to perform the panning and/or tilting operations.

An example of a proposed pan-tilt unit that attaches the drive motors to a stationary housing is described in U.S. Pat. No. 4,945,459 to Ferren et al. A two-axis beam steering system for use in automated light fixtures is configured so that the drive motors are not bodily moved during the steering operations of the unit. Rotational movement of the light beam is achieved using separate drive mechanisms that include multiple pulleys and belts that couple the pulleys to the drive motors.

It is an object of the present invention to provide an improved pan-tilt unit.

SUMMARY

The present invention is a pan-tilt unit for positioning or aiming a device requiring motion control. The unit includes pan and tilt motors that remain stationary relative to a base of the unit during panning and tilting operations. The pan and tilt motors are coupled to a pan platform and a tilt bed to orient the device in response to control signals input to the unit. The motors may be operated in opposite directions to maintain the tilt bed at a fixed angle during a panning operation.

In one embodiment of the invention, the pan-tilt unit includes a base, a pan platform rotatably supported on the base, and a tilt bed rotatably supported on the pan platform for supporting a device on the unit. The pan platform rotates about a pan axis, and the tilt bed rotates about a tilt axis that is transverse to the pan axis. A pan motor is mounted to the base and coupled to the pan platform to drive the pan platform about the pan axis during a panning operation. A tilt motor is mounted to the base and coupled to the tilt bed to drive the tilt bed about the tilt axis during a tilting operation. The pan motor and the tilt motor are stationary relative to the base during the panning and tilting operations. The pan and tilt motors are operated in opposite directions to maintain the tilt bed at a fixed tilt angle about the tilt axis as the pan platform rotates about the pan axis during the panning operation.

In another embodiment of the invention, the pan-tilt unit includes a base, a pan platform rotatably supported on the base, and a tilt bed rotatably supported on the pan platform for supporting a device on the unit. The pan platform rotates about a pan axis, and the tilt bed rotates about a tilt axis that is transverse to the pan axis. A pan motor and a tilt motor are mounted to the base. A pan drive mechanism couples the pan motor to the pan platform to rotate the pan platform about the pan axis during a panning operation. A tilt drive mechanism couples the tilt motor to the tilt bed to rotate the tilt bed about the tilt axis during a tilting operation. The tilt drive mechanism includes a drive shaft that is rotatably supported along the pan axis and coupled to the tilt bed.

In a further embodiment of the invention, the pan-tilt unit includes a base, a pan platform rotatably supported on the base, and a tilt bed rotatably supported on the pan platform for supporting a device on the unit. The pan platform rotates about a pan axis, and the tilt bed rotates about a tilt axis that is perpendicular to the pan axis. A pan motor and a tilt motor is mounted to the base.

A pan drive mechanism couples the pan motor to the pan platform to rotate the pan platform during a panning operation. The pan drive mechanism includes a pan pinion mounted to a shaft of the pan motor and a pan drive gear mounted to the pan platform coaxial with the pan axis. The pan pinion is coupled to the pan drive gear.

A tilt drive mechanism couples the tilt motor to the tilt bed to rotate the tilt bed during a tilting operation. The tilt drive mechanism includes a tilt pinion mounted to a shaft of the tilt motor, a drive shaft rotatably supported along the pan axis, and a tilt drive gear coaxially secured to the drive shaft. The tilt pinion is coupled to the tilt drive gear to rotate the drive shaft about the pan axis. The drive shaft is coupled to the tilt bed to rotate the tilt bed about the tilt axis.

The pan motor and the tilt motor are stationary relative to the base during the panning and tilting operations. The pan and tilt motors are operated in opposite directions to maintain the tilt bed at a fixed tilt angle about the tilt axis as the pan platform rotates about the pan axis during the panning operation.

BRIEF DESCRIPTION OF THE DRAWINGS

The foregoing and other objects and advantages of the present invention will become apparent with reference to the following detailed description when taken in conjunction with the accompanying drawings, wherein like reference characters denote like features, in which.

DETAILED DESCRIPTION

Figure 1:
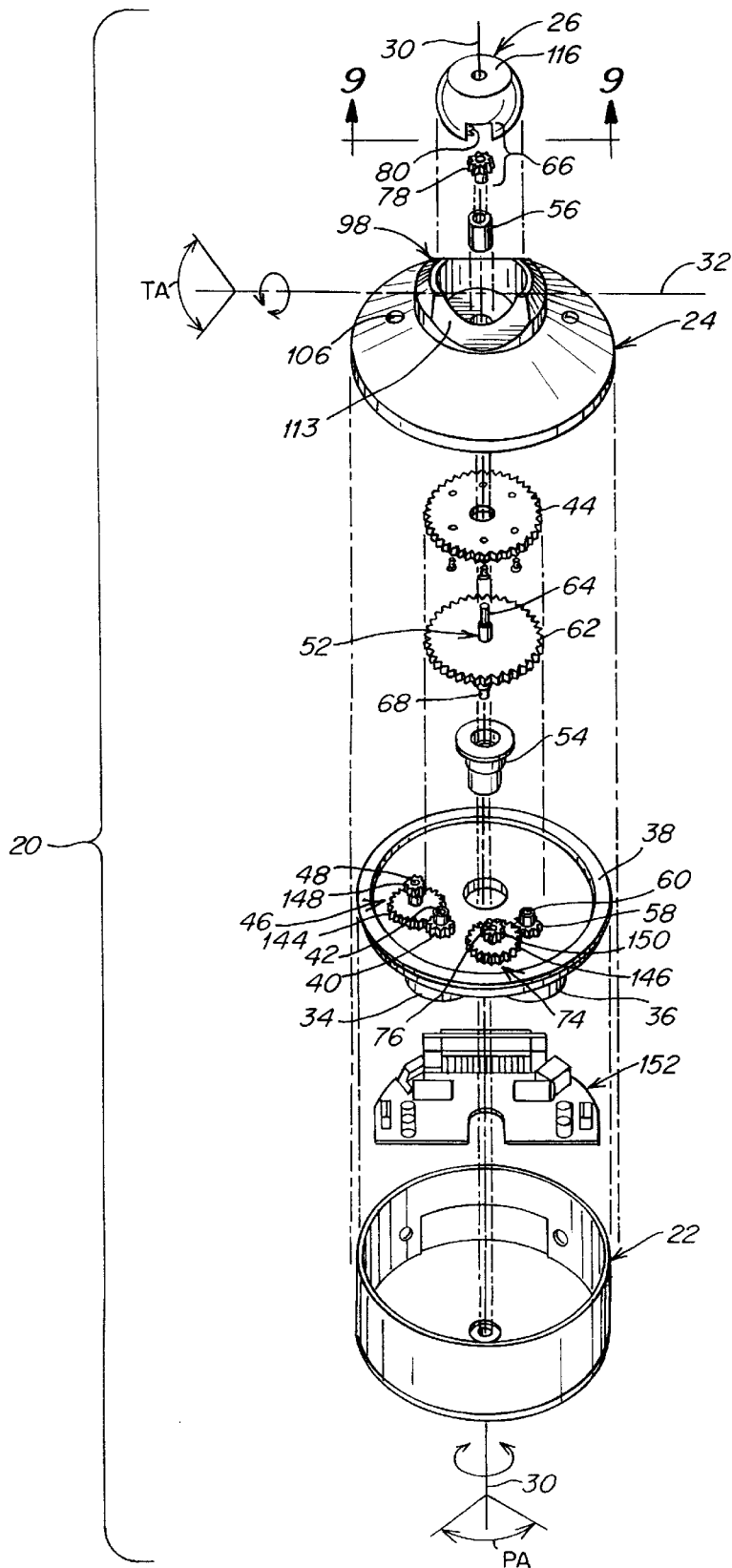
FIG. 1 an exploded, perspective view of a pan-tilt unit according to one illustrative embodiment of the invention.
Figure 2:
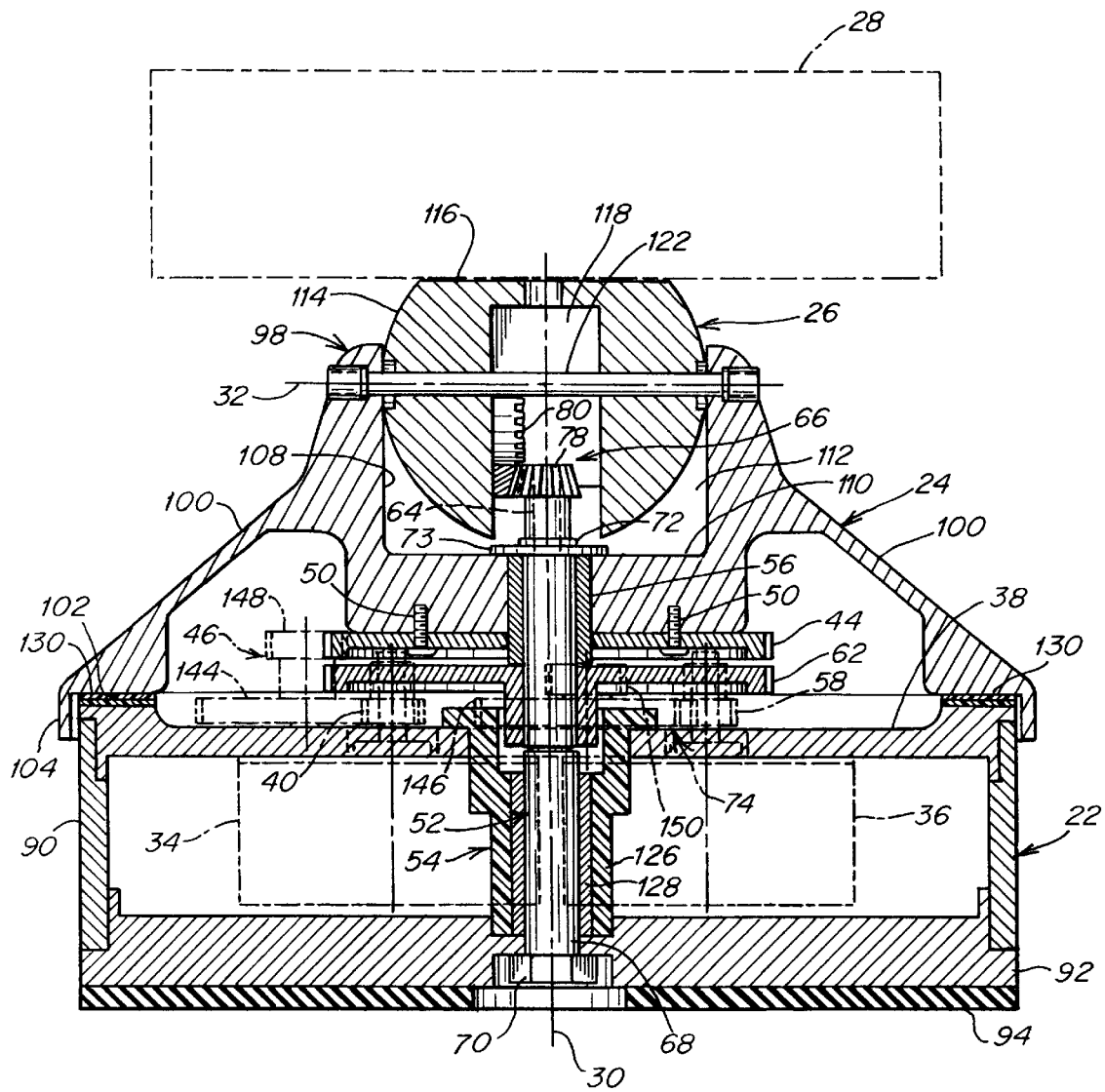
FIG. 2 is a cross-sectional side view of the pan-tilt unit of FIG. 1 taken along the tilt axis.
Figure 3:
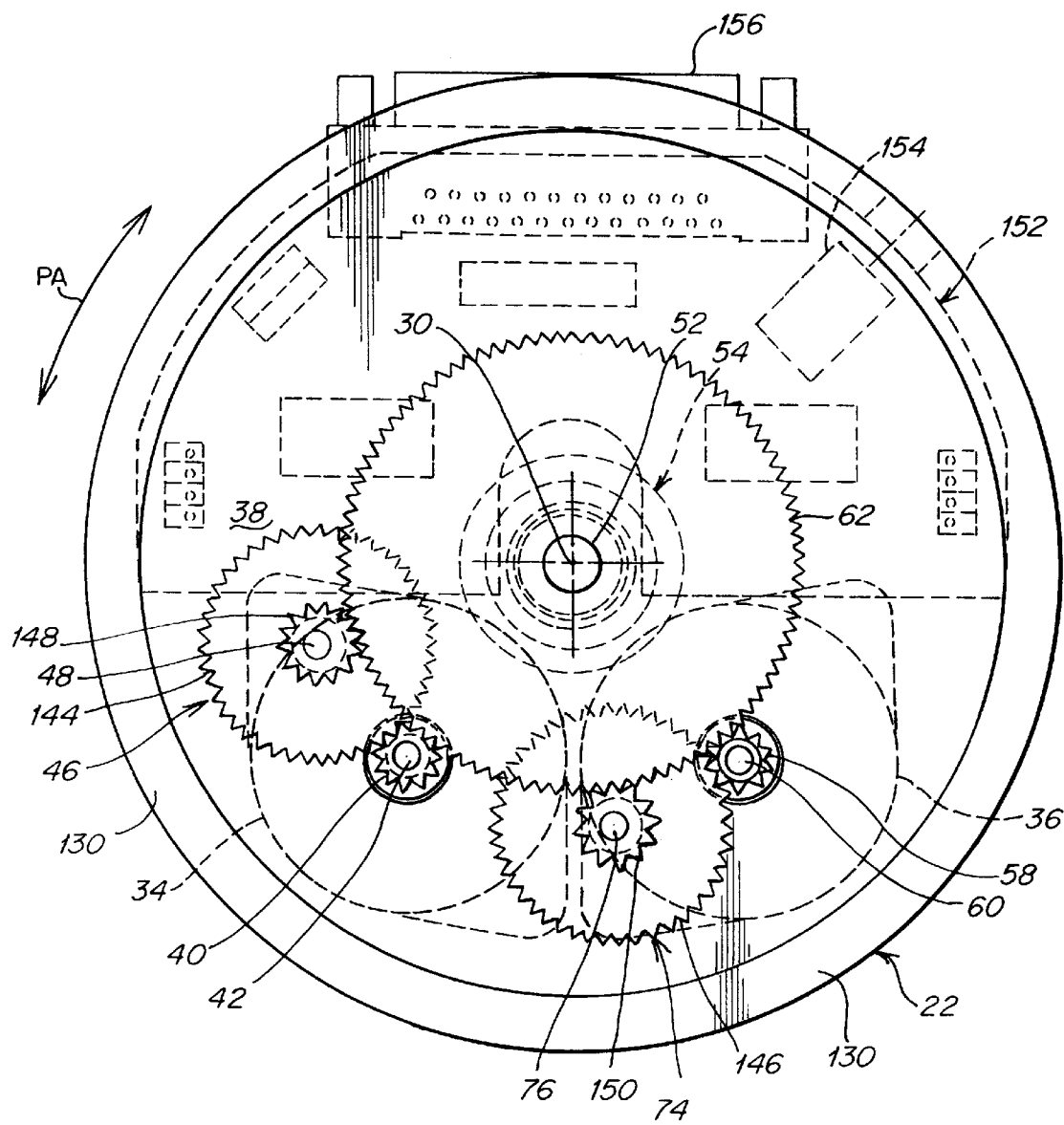
FIG. 3 is a top view of the pan-tilt unit of FIGS. 1–2 illustrated with the pan platform removed from the base.
Figure 4:
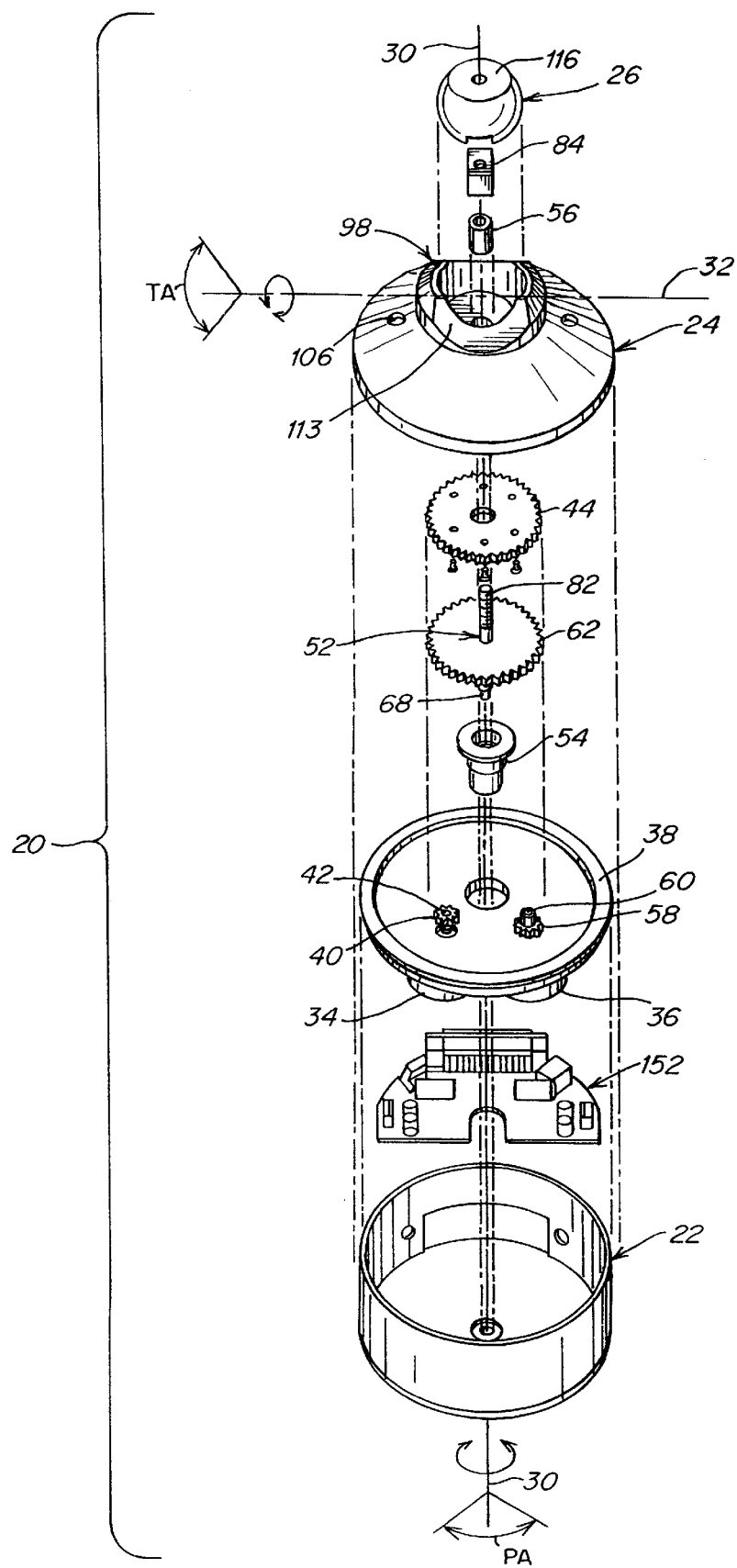
FIG. 4 is an exploded, perspective view of a pan-tilt unit according to another illustrative embodiment of the invention.
Figure 5:
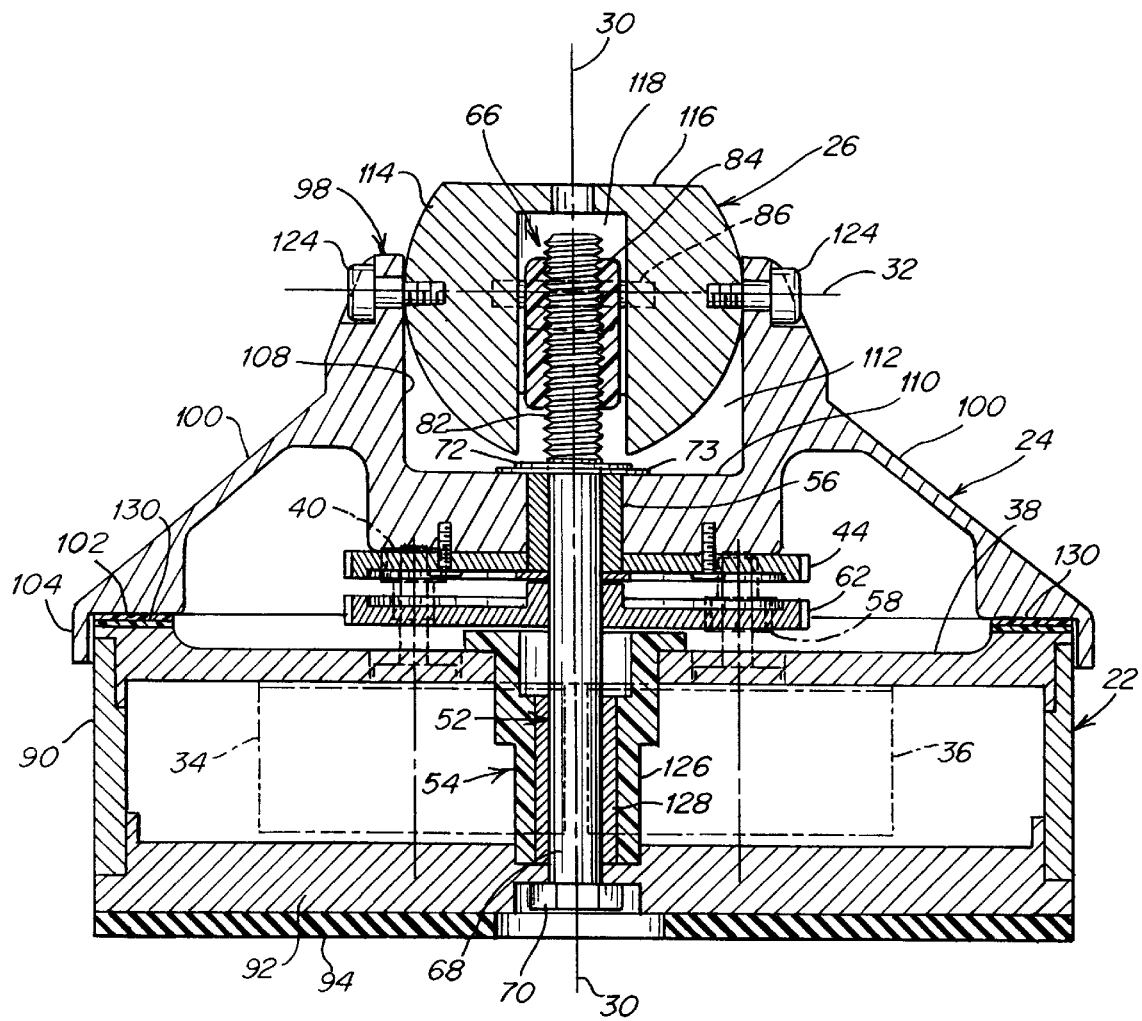
FIG. 5 is a cross-sectional side view of the pan-tilt unit of FIG. 4 taken along the tilt axis.
Figure 6:
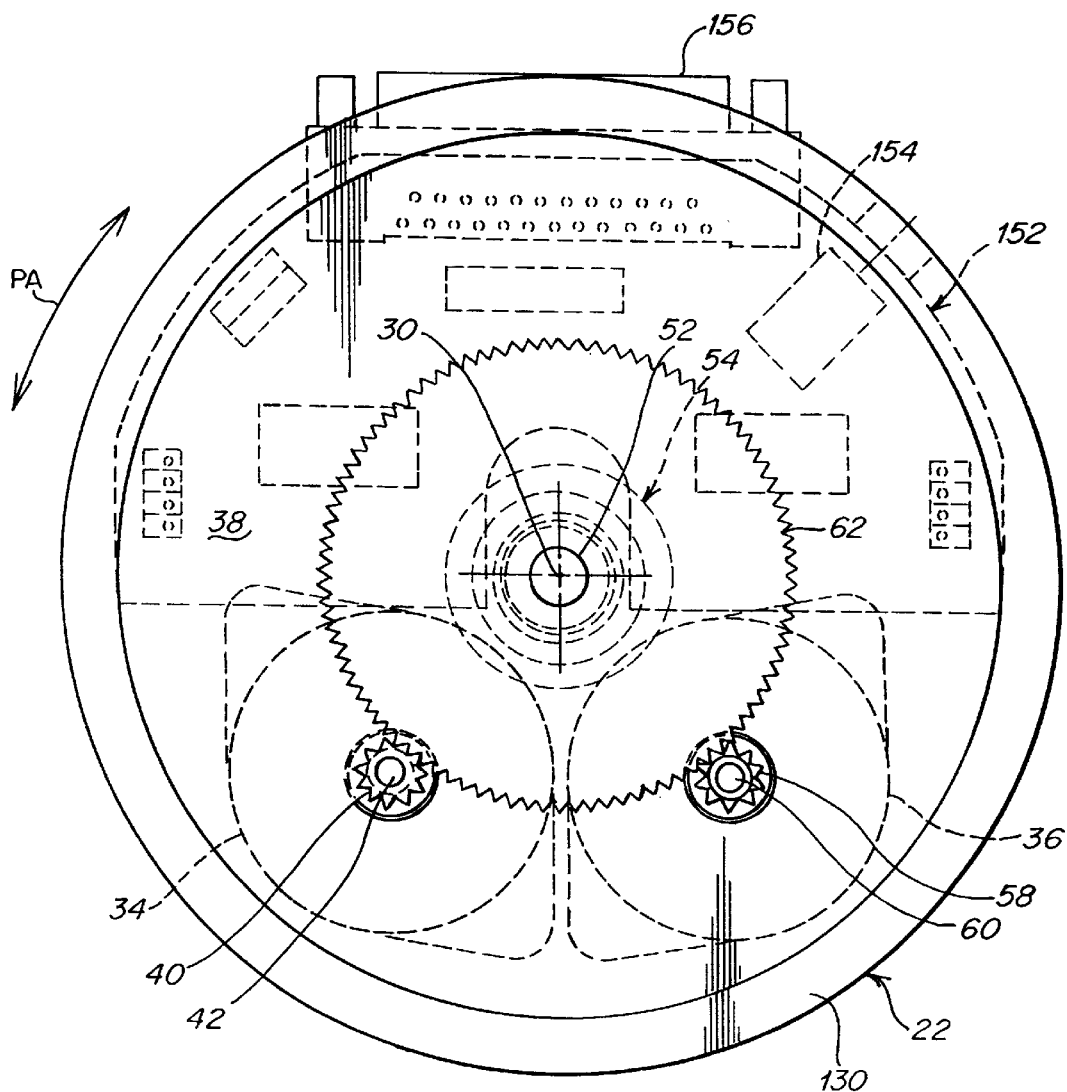
FIG. 6 is a top view of the pan-tilt unit of FIGS. 4–5 illustrated with the pan platform removed from the base.
Figure 7:
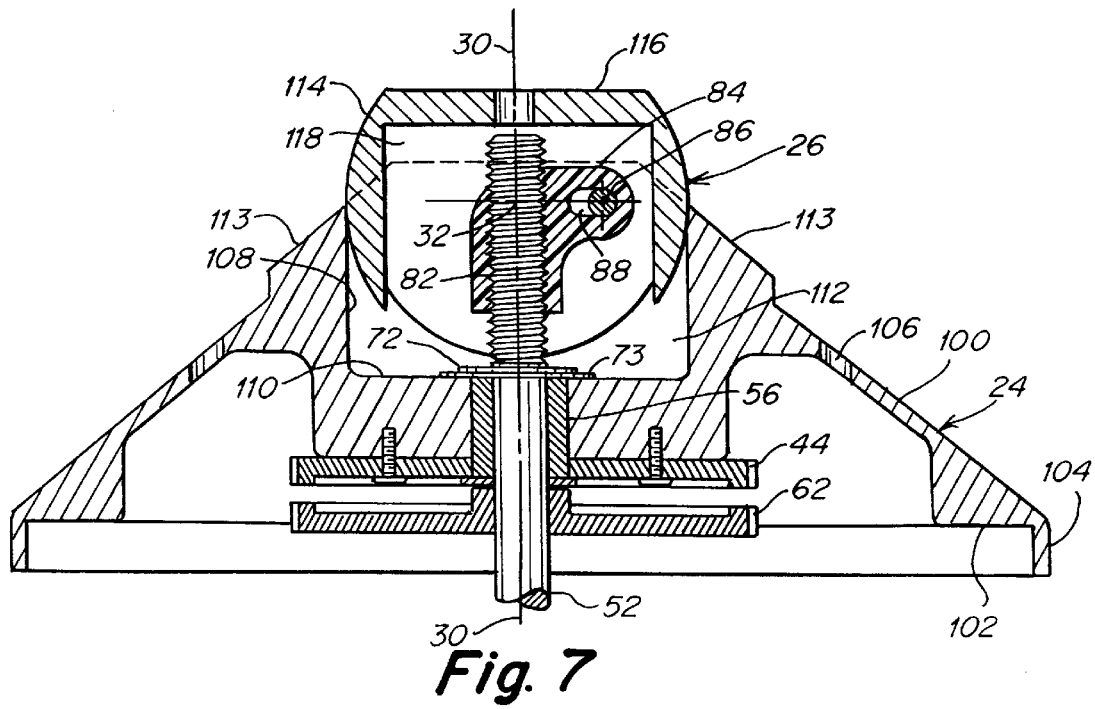
FIG. 7 is a cross-sectional side view of the pan platform of FIG. 4 taken perpendicular to the tilt axis illustrating the tilt bed positioned perpendicular to the pan axis.
Figure 8:
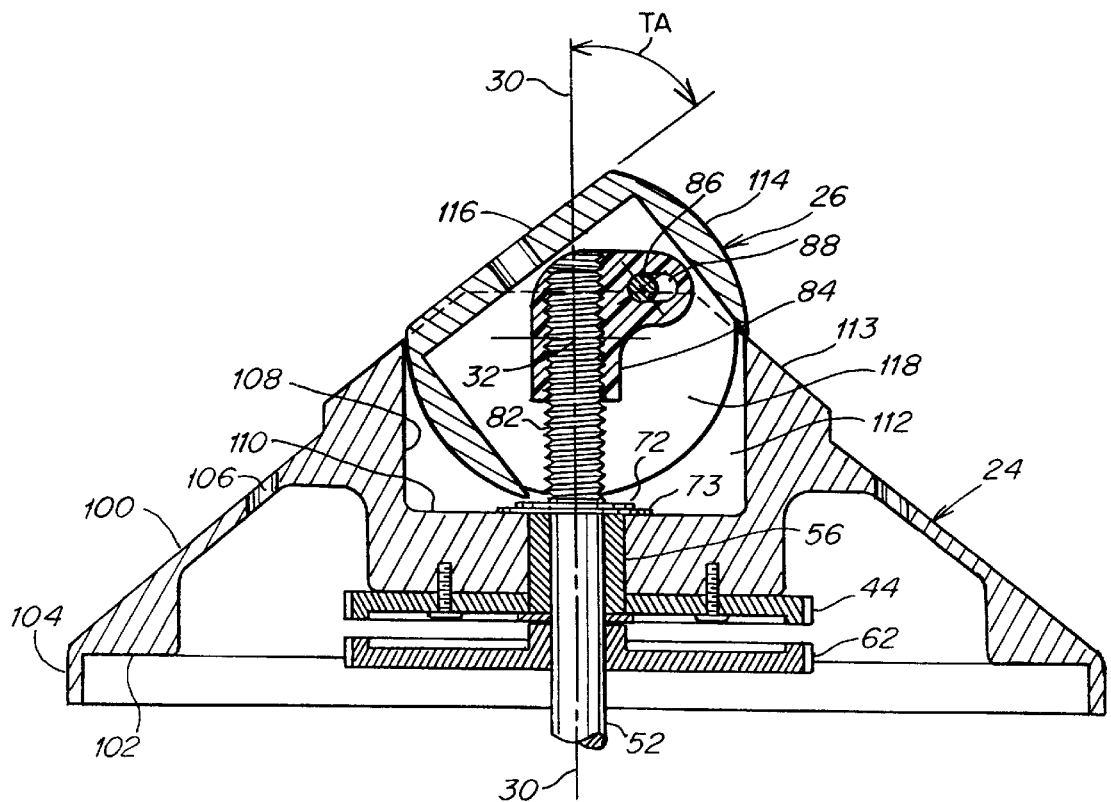
FIG. 8 is a cross-sectional side view of the pan platform of FIG. 4 taken perpendicular to the tilt axis illustrating the tilt bed rotated about the tilt axis to a tilt angle limit.

In an illustrative embodiment of the invention shown in FIGS. 1–3, a pan-tilt unit is provided for positioning or aiming various devices requiring motion control, such as videoconferencing or surveillance cameras, lasers, antennas, lights and the like. The unit may be configured to operate in response to computer generated commands and to receive commands across any suitable communication network, including the Internet. The pan-tilt unit 20 includes a base 22, a rotatable pan platform 24 and a rotatable tilt bed 26 for supporting and selectively orienting the device 28 in a desired direction.

The pan platform 24 is rotatably supported on the base 22 about a pan axis 30, and the tilt bed 26 is rotatably supported on the pan platform 24 about a tilt axis 32, which is transverse to the pan axis 30. The device 28 may be oriented in the desired direction by adjusting the rotational positions of the pan platform 24 and the tilt bed 26 about the pan and tilt axes. As illustrated, the tilt axis 32 is preferably perpendicular to the pan axis 30, although other orientations for the axes may be used. A pan motor 34 and a tilt motor 36 drive the pan platform 24 and the tilt bed 26, respectively, in response to control signals provided to the unit.

The pan and tilt motors 34, 36 are mounted within the base 22 below the pan platform 24 where they remain stationary relative to the base during panning and tilting operations. As illustrated, the motors may be mounted to a common mounting plate 38 which is supported on the base 22. By removing the mass of the motors from the panning and tilting structures, the overall power requirements and size of the motors, particularly the pan motor, is reduced for performing the panning and tilting functions of the unit. The output power generated by the motors 34, 36 is transmitted to the pan platform 24 and the tilt bed 26 using a pan drive mechanism and a tilt drive mechanism, respectively, as described below.

In one illustrative embodiment of the pan drive mechanism, a pan pinion 40 is connected to the shaft 42 of the pan motor 34, and a pan drive gear 44 is fixed, coaxial with the pan axis 30, to the pan platform 24. The pan pinion 40 drives the pan drive gear 44 during the panning operation causing the pan platform 24 to rotate about the pan axis 30 through a desired pan angle PA. A pan cluster gear 46 couples the pan pinion 40 to the pan drive gear 44 to increase the input torque from the pan motor 34 to the pan platform 24. The pan cluster gear 46 may be rotatably supported on a shaft 48 that is secured to the motor mounting plate 38.

The pan pinion 40, the pan drive gear 44 and the pan cluster gear 46 may include spur gears configured with a gear ratio for delivering a desired amount of torque to the pan platform 24. The delivered torque may be adjusted for particular applications by changing the gear ratio in any suitable manner apparent to one of skill. Additionally, the pan drive mechanism may incorporate any suitable type or combination of gears.

As shown in FIG. 2, the pan drive gear 44 may be secured to the underside of the pan platform 24 below the tilt bed 26 using fasteners 50, such as screws, or other suitable fastening means, such as an adhesive or the like. Alternatively, the pan drive gear 44 may be formed as an integral part of the pan platform 24.

In one illustrative embodiment of the tilt drive mechanism, a drive shaft 52 is rotatably supported along the pan axis 30 with a lower bearing 54 that is fixed to the mounting plate 38 and an upper bearing 56 that is fixed to the pan platform 24. A tilt pinion 58 is connected to the shaft 60 of the tilt motor 36, and a tilt drive gear 62 is coaxially secured to an intermediate portion of the drive shaft 52 to be driven by the tilt pinion 58 during the tilting operation to rotate the drive shaft 52 about the pan axis 30. A tilt cluster gear 74 couples the tilt pinion 58 to the tilt drive gear 62 to increase the input torque from the tilt motor 36 to the tilt bed 26. The tilt cluster gear 74 may be rotatably supported on a shaft 76 that is secured to the motor mounting plate 38.

The upper end 64 of the drive shaft 52 extends through the pan drive gear 44 and upper bearing 54 and includes a drive shaft coupling 66 that joins the drive shaft 52 to the tilt bed 26. The drive shaft coupling 66 transforms rotation of the drive shaft 52 into rotation of the tilt bed 26 about the tilt axis 32 through a desired tilt angle TA. The pan drive gear includes a clearance hole for the drive shaft that is sufficient to separate rotation of the pan platform and the drive shaft.

Similar to the pan drive mechanism, the drive pinion 58, the tilt drive gear 62 and the tilt gear cluster may include spur gears configured with a gear ratio for delivering a desired amount of torque to the drive shaft 52. The delivered torque may be adjusted for particular applications by changing the gear ratio in any suitable manner apparent to one of skill. Additionally, the tilt drive mechanism may incorporate any suitable type or combination of gears.

As illustrated in FIG. 2, the lower portion 68 of the drive shaft 52 extends through the lower bearing 54 so that its lower end protrudes from the bottom of the lower bearing 54 and is secured with a suitable fastener 70, such as a nut, to prevent the shaft 52 from being removed from the base 22. The length of the lower portion 68 of the drive shaft between its lower end and the tilt drive gear 62 is approximately equal to the length of the lower bearing 54 to substantially eliminate axial movement along the pan axis 30 to maintain the tilt drive mechanism components in proper alignment. The pan platform 24 is secured to the base 22 using a retaining ring 72 that snaps onto the upper portion 64 of the drive shaft adjacent the upper bearing 56. A thrust washer 73 may be provided between the retaining ring 72 and the pan platform 24 to substantially eliminate axial movement between the pan platform and the drive shaft.

In one embodiment as shown in FIGS. 1-2, the drive shaft coupling 66 includes a drive pinion 78 secured to the upper end of the drive shaft 52 and a tilt gear 80 that is fixed to the tilt bed 26 coaxial with the tilt axis 32. The drive pinion 78 directly engages and drives the tilt gear 80 to rotate the tilt bed 26 about the tilt axis 32 as the drive shaft 52 is rotated about the pan axis 30 by the tilt motor 36. The input torque from the drive shaft 52 to the tilt bed 26 may be adjusted for particular applications by selecting the gear ratio between the drive pinion 78 and the tilt drive gear 80. The drive pinion 78 and the tilt gear 80 preferably are straight bevel gears, although other suitable types or combinations of gears may be used as would be apparent to one of skill.

In another embodiment of the drive shaft coupling as illustrated in FIGS. 4–8, the upper end of the drive shaft 52 includes a lead screw 82 that threadedly engages a cam link 84 which is pivotally connected to the tilt bed 26 at a location spaced from the tilt axis 32. Rotating the drive shaft 52 causes the lead screw 82 to drive the cam link 84 along the pan axis 30 either toward or away from the tilt bed 32 in response to the direction of shaft rotation.

Axial movement of the cam link 84 along the shaft 52 is transmitted to the tilt bed 26 via a pin 86 that interconnects the cam link 84 and the tilt bed 26. Since the pin 86 is offset from the tilt axis 32, the force applied to the pin 86 by the cam link 84 produces a torque that rotates the tilt bed 26 about the tilt axis 32. The input torque from the drive shaft 52 to the tilt bed 26 may be adjusted for particular applications by selecting the thread pitch for the lead screw 82 and/or the distance between the pin 86 and the tilt axis 32. As illustrated, the pan and tilt drive mechanisms may be configured without cluster gears so that the pan and tilt pinions 40, 58 directly engage and drive the pan and tilt drive gears 44, 62.

The cam link 84 may include an L-shaped member that is formed from a plastic material, although other suitable shapes and materials may be used as would be apparent to one of skill. The pin 86 preferably extends through a slot 88 in a horizontal extension of the cam link to reduce the potential for the cam link to bind on the pin during the tilting operation.

In the illustrative embodiments of the pan-tilt unit, the pan and drive motors 34, 36 may be operated independently to affect the pan and tilt angles of the tilt bed 26. However, it should be observed that movement of the tilt bed 26 about the pan and tilt axes 30, 32 are not entirely independent. For example, rotation of the pan platform 24, and therefore the tilt bed 26, about the pan axis 30 during a panning operation causes the tilt bed 26 to rotate about the tilt axis 32 due to the interaction of the drive shaft coupling 66 between the tilt bed and the drive shaft. Thus, panning the tilt bed 26 will induce the tilt bed to rotate about the tilt axis 32 absent some form of compensation. Consequently, the pan and tilt motors 34, 36 may be controlled to produce a desired combination of pan and tilt movement.

In one illustrative embodiment, to maintain the tilt bed 26 at a fixed tilt angle TA about the tilt axis 32 during a panning operation, the drive shaft 52 is rotated about the pan axis 30 in a direction opposite to the rotational direction of the pan platform 24 about the pan axis to compensate for the effects of the drive shaft coupling 66. The amount of compensation depends on several factors, including gear ratios and motor speed. For example, when the gear ratio between the pan pinion 40 and the pan drive gear 44 is equal to the gear ratio between the tilt pinion 58 and the tilt drive gear 62, the pan and tilt motors are operated in opposite directions at the same speed to maintain a fixed tilt angle. The tilt angle TA may be subsequently adjusted by operating the tilt motor 36 alone to rotate the tilt bed. To effectuate a desired tilt angle adjustment during the panning operation, the speed and/or direction of one or both of the pan and tilt motors may be adjusted relative to each other.

As described above, the base 22 rotatably supports the pan platform 24 and the tilt bed 26, and houses the motors 34, 36 and drive mechanisms of the unit. In one embodiment illustrated in FIGS. 2 and 5, the base 22 includes a cylindrical housing with a circular sidewall 90 that is disposed along the periphery of a bottom plate 92. The sidewall and bottom plate may be configured as a press fit assembly wherein the sidewall 90 is fit tightly about the periphery of the bottom plate 92. Alternately, the bottom and the sidewall of the base may be formed as a unitary structure and/or with different shapes in a manner apparent to one of skill.

The base 22 may include a slip-resistant bottom surface to prevent the pan-tilt unit from moving across a support structure, such as a table, during operation. In one embodiment, an elastomeric pad 94 may be bonded to the bottom surface of the housing.

As described above, the pan and tilt motors 34, 36 may be secured to a mounting plate 38 which is supported on the base 22. As illustrated, the mounting plate may be a full circular plate, although any other suitable shape, such as a partial circular plate, may be implemented in the base. In one embodiment (FIGS. 2 and 5), the mounting plate is configured to be press fit onto the top of the base. It is to be understood, however, that the motors may be mounted on the base using any suitable means apparent to one of skill.

As illustrated in FIGS. 1–2 and 4–5, one embodiment of the pan platform 24 includes a tilt bed mount 98 that is coaxially located along the pan axis 30. An angled wall 100 extends radially outward from the tilt bed mount 98 to give the pan platform 24 a generally conical shape. The outer periphery of the angled wall 100 includes a support surface 102 that is disposed over the periphery of the mounting plate 38 to support the pan platform on the base. A downwardly extending wall 104 disposed along the outer periphery of the angled wall 100 forms a lip that lies adjacent the base sidewall 90 for concealing the interface between the pan platform and the base, and for reducing the infiltration of foreign matter between the pan platform and the base. Vent holes 106 may be provided in the angled wall 100 to allow heat generated by the motors and control circuits to be dissipated from the base.

The tilt bed mount 98 may be generally cylindrical and include an elongated circular sidewall 108 extending in the axial direction along the pan axis 30 and a bottom wall 110 at the lower end of the sidewall to form a well 112 in which is suspended the tilt bed 26. The upper portion 64 of the drive shaft 52 extends upwardly through the bottom wall 110 of the well to support the drive coupling 66 in the well 112 adjacent the tilt bed. The upper bearing 56 for supporting the drive shaft 52 is mounted on the bottom wall 110, and may include a bushing that extends through the wall. Portions 113 (FIGS. 1 and 4) of the sidewall 108 on opposite sides of the tilt axis 32 may be angled (FIGS. 7–8) similar to the angled wall 100 of the pan platform to facilitate rotation of the device about the tilt axis while maintaining a relatively low profile.

As illustrated, the tilt bed 26 includes a spherical body 114 with a flat upper surface 116 for supporting the device on the unit. The body 114 has a downwardly facing cavity 118 that receives the drive shaft coupling for rotating the tilt bed during a tilting operation. The tilt bed 26 may include one or more stops that are positioned to limit the amount of rotation about the tilt axis. For example, rotation of the tilt bed may be restricted so that the upper surface i 16 of the tilt bed is approximately coplanar (FIG. 8) with the angled portions 113 of the tilt mount sidewall 108 at the tilt angle limits.

Figure 9:
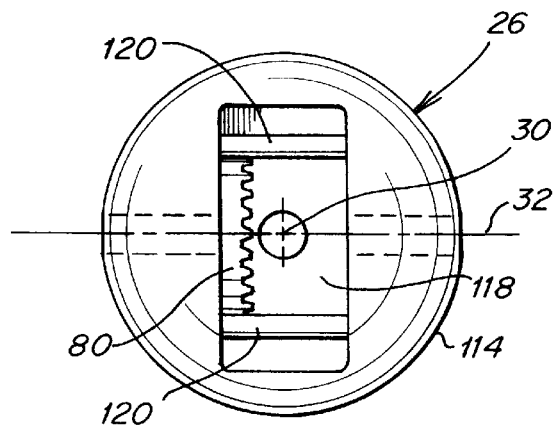
FIG. 9 is a bottom view of the tilt bed taken along view line 9—9 of FIG. 1.

In one embodiment, the tilt bed stops include a pair of pins 120 (FIG. 9) that extend across the ends of the cavity 118 to abut the drive shaft 52 when the tilt bed is rotated to a predetermined tilt angle TA. For example, the pins 120 may be arranged on the tilt bed to limit the tilt angle TA to approximately ±30° from the pan axis 30. It is to be understood that any suitable tilt bed configuration having other tilt angle limits may be used as would be apparent to one of skill.

The tilt bed 26 may be rotatably mounted to the tilt bed mount using any suitable configuration. In one illustrative embodiment, the tilt bed 26 is rotatably mounted to the tilt bed mount 98 with an axle 122 (FIG. 2) that extends through the tilt bed along the tilt axis 32 and is connected to opposite sides of the mount sidewall 108. In another illustrative embodiment, the tilt bed 26 is rotatably secured to the tilt bed mount 98 with shoulder screws 124 (FIG. 5) that extend through the tilt mount sidewalls 108 and engage the tilt bed along the tilt axis.

The base, pan platform and tilt bed may each be formed from a metal, such as aluminum, that combine light weight with structural integrity. These components may be machined, cast or manufactured using other suitable processes and from other suitable materials. For example, it is contemplated that they may be molded from a rigid plastic material, such as polycarbonate.

The upper and lower bearings may be formed from any suitable material including plastic, oil-impregnated metal, or other material having a low coefficient of friction. In one embodiment, the lower bearing 54 includes a plastic outer sleeve 126 and an oil-impregnated bronze bushing pressed in the outer sleeve 128 for supporting the lower portion of the drive shaft 52. Similarly, the upper bearing 56 includes an oil-impregnated bronze bushing for supporting the upper portion of the drive shaft.

To facilitate rotation of the pan platform 24 on the base 22, a pan bearing may be disposed between the support surface 102 and the sidewall of the base. In one embodiment, a pair of thrust washers 130 may be disposed along the entire periphery of the base sidewall 90. The thrust washers may include plastic washers, such as PTFE and the like, having a low coefficient of friction therebetween. In other embodiments, the bearing may include a needle bearing, a roller bearing or any other suitable bearing arrangement apparent to one of skill in the art.

The pan platform 24 may include one or more pan stops (not shown) for limiting the amount of pan rotation about the pan axis. The pan stops may be selectively positioned to allow rotation about the pan axis through a desired pan angle PA up to approximately 360°. Pan stops may be particularly useful for preventing a device cable from becoming wound about the unit due to excessive panning in one direction.

Various fastening systems may be implemented on the pan-tilt unit 20 for securing the device 28 to the tilt bed 26. Since the mass of the device relative to the pan axis can impact the operation of the unit, it may be desirable to maintain the device center of gravity in close proximity to the pan axis, particularly as the weight of the device increases.

Figure 10:
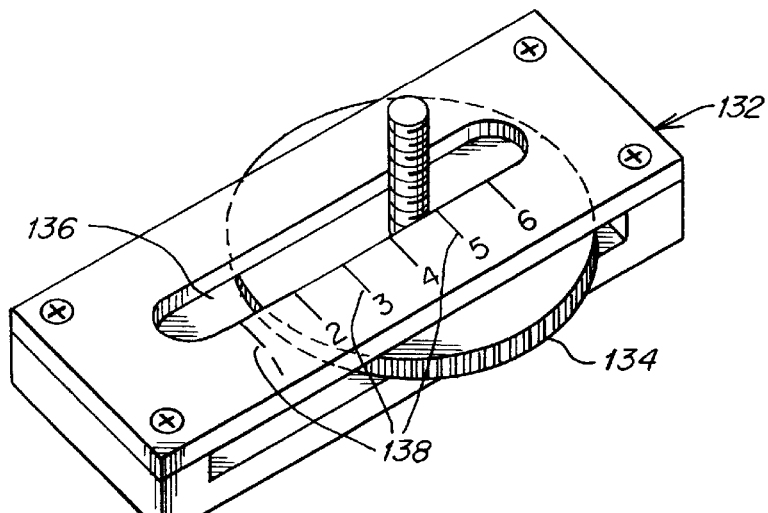
FIG. 10 is a perspective view of one illustrative embodiment of a fastening system for mounting a device to the pan-tilt unit.

In one illustrative embodiment shown in FIG. 10, the fastenening system may include an adapter plate 132 that attaches directly to the upper surface of the tilt bed for interconnecting the device to the tilt bed. To account for variations in the center of gravity between several devices that may be mounted to the pan-tilt unit, the adapter plate 132 may include a thumb screw 134 that is slidable along a slot 136 in the plate to selectively locate the center of gravity relative to the pan axis. When tightened, the thumb screw 134 draws the device tightly against the adapter plate to secure the device to the tilt bed. The adapter plate 132 may include indicia 138 arranged to facilitate the adjustment for any one of several particular devices.

Figure 11:
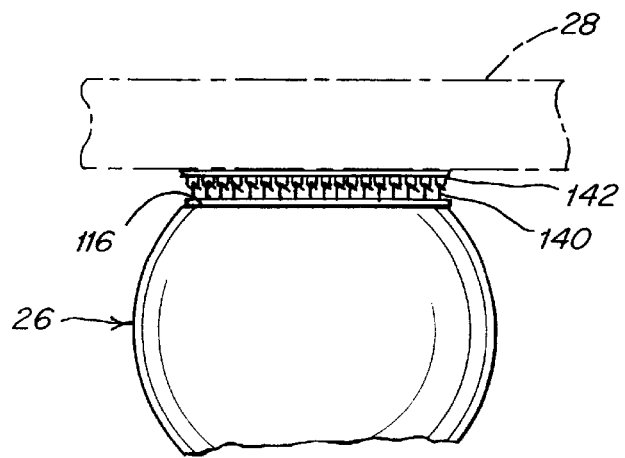
FIG. 11 is a side view of another illustrative embodiment of a fastening system for mounting a device to the pan-tilt unit.

In another illustrative embodiment shown in FIG. 11, the fastening system may include hook and loop-type fasteners, such as VELCRO fasteners. One of the fastener portions 140, either the hook or the loop, may be attached to the upper surface 116 of the tilt bed, and the other fastener portion 142 may be attached to the device. The device may be readily mounted to or removed from the pan-tilt unit by simply pressing the fasteners together or pulling them apart. This system may be suitable for light weight devices.

As described above, the pan and tilt drive mechanisms may be configured with particular gear ratios that increase the input torque from the motors 34, 36 to the pan platform 24 and the tilt bed 26. For example, the pan drive mechanism may be configured to increase the input torque to the pan platform by a factor of 18× using a pan cluster gear reduction ratio of 3:1 in combination with a cluster gear to pan drive gear reduction ratio of 6:1. Similarly, the tilt drive mechanism may be configured to increase the input torque to the tilt bed by a factor of 54× to 72× using a tilt cluster gear reduction ratio of 3:1, a cluster gear to tilt drive gear reduction ratio of 6:1, and a drive shaft coupling reduction ratio of 3:1 to 4:1.

In one illustrative embodiment shown in FIGS. 1–3, these reduction ratios may be achieved using pan and tilt cluster gears 46, 74 that include a 48-tooth gear 144, 146 affixed to a 16-tooth gear 148, 150, and a 96-tooth pan and tilt drive gears 44, 62. The pan and tilt pinions 40, 58 include a 12-tooth pinion that engages the 48-tooth cluster gear 144, 146, and the 16-tooth cluster gear 148, 150 engages the pan and tilt drive gears 44, 62. The drive shaft coupling may include a 12-tooth bevel pinion 78 in combination with either a 36-tooth or 48-tooth bevel gear 80. The motor pinions 40, 58, cluster gears 46, 74 and the drive gears 44, 62 may be spur gears with a 20° pressure angle. The gears for the drive mechanisms may be commercially available plastic and/or metal gears. It is to be appreciated that the drive mechanisms may include any suitable gears and arrangements apparent to one of skill.

In one embodiment, the pan and tilt motors 34, 36 include bipolar stepper motors that rotate 7.5 step and operate on 12V dc. One example of a suitable drive motor is a Haydon Switch and Instrument Model 36000, which generates approximately 2.9–1.0 oz-in. of torque as a function of the pulse rate. To compensate for the effects of the panning motion, the tilt motor may be operated in lock-step with and opposite direction to the pan motor as described above. It is to be appreciated that the drive motors may include any suitable type motor as would be apparent to one of skill in the art.

The combination of drive motors with the pan and tilt drive mechanisms described above may be implemented in a pan-tilt unit capable of manipulating a payload of approximately 2.2 lbs. It should be understood that the disclosed configurations are exemplary and that other drive mechanism configurations may be implemented to orient payloads of varying weight.

As illustrated, the pan-tilt unit includes a control module that provides the control interface to the motors. In one embodiment, the control module includes a circuit card assembly 152 that is mounted within the base. The control module may include a power connector 154 and a signal connector 156 that interfaces with an external controller for providing operational commands to the pan-tilt unit. The control module may be configured to receive and operate the pan-tilt unit in response to control signals generated by any suitable controller, including computer generated commands. The control module may also receive commands across any suitable communication network, including the Internet.

The control module may also include a camera zoom controller that communicates with a camera that is mounted to the pan-tilt unit for adjusting the camera zoom. In one embodiment, the zoom controller may be an infrared transmitter that communicates with a corresponding infrared receiver provided on the camera for controlling the zoom functions on the camera. The transmitter may be mounted on the circuit card assembly 152 to be controlled by signals input to the control module. Alternately, the transmitter may be provided with an external unit that interfaces with the pan-tilt unit through a connector that is linked to the circuit card assembly.

Having described several embodiments of the invention in detail, various modifications and improvements will readily occur to those skilled in the art. Such modifications and improvements are intended to be within the spirit and scope of the invention. Accordingly, the foregoing description is by way of example only and is not intended as limiting. The invention is limited only as defined by the following claims and their equivalents.

What is claimed is:

1. A pan-tilt unit for panning and tilting a device, the pan-tilt unit comprising:
   a base;
   a pan platform rotatably supported on the base about a pan axis;
   a tilt bed rotatably supported on the pan platform about a tilt axis that is transverse to the pan axis, the tilt bed being constructed and arranged to support a device thereon;
   a pan motor mounted to the base and coupled to the pan platform to drive the pan platform about the pan axis during a panning operation; and
   a tilt motor mounted to the base and coupled to the tilt bed to drive the tilt bed about the tilt axis during a tilting operation;
   each of the pan motor and the tilt motor being stationary relative to the base during the panning and tilting operations, the pan and tilt motors to be operated in opposite directions to maintain the tilt bed at a fixed tilt angle about the tilt axis as the pan platform rotates about the pan axis during the panning operation.

2. The pan-tilt unit recited in claim 1, further comprising a drive shaft rotatably supported along the pan axis, the drive shaft coupling the tilt motor to the tilt bed.

3. The pan-tilt unit recited in claim 2, wherein the drive shaft is fixed against axial movement along the pan axis.

4. The pan-tilt unit recited in claim 1, further comprising a motor mount plate that is supported on the base perpendicular to the pan axis, the pan and tilt motors being mounted to the motor mount plate.

5. The pan-tilt unit recited in claim 4, wherein each of the pan and tilt motors has a motor shaft that lies parallel to the pan axis.

6. The pan-tilt unit recited in claim 1, wherein the pan and tilt motors are operated concurrently to maintain the tilt bed at the fixed tilt angle during the panning operation.

7. The pan-tilt unit recited in claim 1, wherein the pan axis intersects the tilt axis.

8. The pan-tilt unit recited in claim 1, further comprising a pan drive mechanism that includes a plurality of gears directly coupling the pan motor to the pan platform.

9. The pan-tilt unit recited in claim 8, wherein the plurality of gears includes a pan drive gear that is affixed to the pan platform.

10. The pan-tilt unit recited in claim 8, further comprising a tilt drive mechanism that includes a plurality of gears directly coupling the tilt motor to the tilt bed.

11. A pan-tilt unit for panning and tilting a device, the pan-tilt unit comprising:
    a base;
    a pan platform rotatably supported on the base about a pan axis;
    a tilt bed rotatably supported on the pan platform about a tilt axis that is transverse to and intersects the pan axis, the tilt bed being constructed and arranged to support a device thereon;
    a pan motor mounted to the base;
    a tilt motor mounted to the base;
    a pan drive mechanism coupling the pan motor to the pan platform to rotate the pan platform about the pan axis during a panning operation; and
    a tilt drive mechanism coupling the tilt motor to the tilt bed to rotate the tilt bed about the tilt axis during a tilting operation, the tilt drive mechanism including a drive shaft that is rotatably supported along the pan axis and coupled to the tilt bed.

12. The pan-tilt unit recited in claim 11, wherein the tilt axis is perpendicular to the pan axis.

13. A pan-tilt unit for panning and tilting a device, the pan-tilt unit comprising:
    a base;
    a pan platform rotatably supported on the base about a pan axis;
    a tilt bed rotatably supported on the pan platform about a tilt axis that is transverse to the pan axis, the tilt bed being constructed and arranged to support a device thereon;
    a pan motor mounted to the base;
    a tilt motor mounted to the base;
    a pan drive mechanism coupling the pan motor to the pan platform to rotate the pan platform about the pan axis during a panning operation; and
    a tilt drive mechanism coupling the tilt motor to the tilt bed to rotate the tilt bed about the tilt axis during a tilting operation, the tilt drive mechanism including a drive shaft that is rotatably supported along the pan axis and coupled to the tilt bed, the drive shaft being fixed against axial movement along the pan axis.

14. A pan-tilt unit for panning and tilting a device, the pan-tilt unit comprising:
    a base;
    a pan platform rotatably supported on the base about a pan axis;
    a tilt bed rotatable supported on the pan platform about a tilt axis that is transverse to the pan axis, the tilt bed being constructed and arranged to support a device thereon;
    a pan motor mounted to the base;
    a tilt motor mounted to the base;
    a pan drive mechanism coupling the pan motor to the pan platform to rotate the pan platform about the pan axis during a panning operation, the pan drive mechanism including a pan pinion mounted to a shaft of the pan motor and a pan drive gear mounted to the pan platform coaxial with the pan axis, the pan pinion being coupled to the pan drive gear; and a tilt drive mechanism coupling the tilt motor to the tilt bed to rotate the tilt bed about the tilt axis during a tilting operation, the tilt drive mechanism including a drive shaft that is rotatable supported along the pan axis and coupled to the tilt bed.

15. The pan-tilt unit recited in claim 14, wherein the tilt drive mechanism includes a tilt pinion mounted to a shaft of the tilt motor and a tilt drive gear coaxially secured to the drive shaft, the tilt pinion being coupled to the tilt drive gear to rotate the drive shaft about the pan axis.

16. The pan-tilt unit recited in claim 15, wherein the pan drive gear and the tilt drive gear are spur gears directly engaged by the pan pinion and the tilt pinion, respectively.

17. The pan-tilt unit recited in claim 15, wherein the tilt drive mechanism further comprises a tilt cluster gear coupling the tilt pinion to the tilt drive gear.

18. The pan-tilt unit recited in claim 15, wherein the pan drive mechanism further includes a pan cluster gear coupling the pan pinion to the pan drive gear.

19. A pan-tilt unit for panning and tilting a device, the pan-tilt unit comprising:

a base;

a pan platform rotatably supported on the base about a pan axis;

a tilt bed rotatably supported on the pan platform about a tilt axis that is transverse to the pan axis, the tilt bed being constructed and arranged to support a device thereon;

a pan motor mounted to the base;

a tilt motor mounted to the base;

a pan drive mechanism coupling the pan motor to the pan platform to rotate the pan platform about the pan axis during a panning operation; and a tilt drive mechanism coupling the tilt motor to the tilt bed to rotate the tilt bed about the tilt axis during a tilting operation, the tilt drive mechanism including a drive shaft that is rotatably supported along the pan axis and coupled to the tilt bed, the tilt drive mechanism further including a drive pinion mounted to the drive shaft and a tilt gear mounted to the tilt bed, the drive pinion driving the tilt gear to rotate the tilt bed.

20. The pan-tilt unit recited in claim 19, wherein the tilt gear is coaxial with the tilt axis.

21. The pan-tilt unit recited in claim 20, the drive pinion and the tilt gear are bevel gears.

22. A pan-tilt unit for panning and tilting a device, the pan-tilt unit comprising:

a base;

a pan platform rotatable supported on the base about a pan axis;

a tilt bed rotatably supported on the pan platform about a tilt axis that is transverse to the pan axis, the tilt bed being constructed and arranged to support a device thereon;

a pan motor mounted to the base;

a tilt motor mounted to the base;

a pan drive mechanism coupling the pan motor to the pan platform to rotate the pan platform about the pan axis during a panning operation; and a tilt drive mechanism coupling the tilt motor to the tilt bed to rotate the tilt bed about the tilt axis during a tilting operation, the tilt drive mechanism including a drive shaft that is rotatably supported along the pan axis and coupled to the tilt bed, the drive shaft including a lead screw and the tilt drive mechanism further including a cam link that threadedly engages the lead screw so that rotation of the drive shaft drives the cam link along the pan axis, the cam link being pivotally connected to the tilt bed to rotate the tilt bed as the cam link moves along the pan axis.

23. The pan-tilt unit recited in claim 22, wherein the cam link is connected to the tilt bed at a location spaced from the tilt axis.

24. The pan-tilt unit recited in claim 23, wherein the cam link is connected to the tilt bed with a pin that extends through a slot in the cam link.

25. A pan-tilt unit for panning and tilting a device, the pan-tilt unit comprising:

a base;

a pan platform rotatably supported on the base about a pan axis;

a tilt bed rotatably supported on the pan platform about a tilt axis that is perpendicular to the pan axis, the tilt bed being constructed and arranged to support a device thereon;

a pan motor mounted to the base;

a tilt motor mounted to the base;

a pan drive mechanism coupling the pan motor to the pan platform to rotate the pan platform during a panning operation, the pan drive mechanism including a pan pinion mounted to a shaft of the pan motor and a pan drive gear mounted to the pan platform coaxial with the pan axis, the pan pinion being coupled to the pan drive gear; and a tilt drive mechanism coupling the tilt motor to the tilt bed to rotate the tilt bed during a tilting operation, the tilt drive mechanism including a tilt pinion mounted to a shaft of the tilt motor, a drive shaft rotatably supported along the pan axis, and a tilt drive gear coaxially secured to the drive shaft, the tilt pinion being coupled to the tilt drive gear to rotate the drive shaft about the pan axis, the drive shaft being coupled to the tilt bed to rotate the tilt bed about the tilt axis;

each of the pan motor and the tilt motor being stationary relative to the base during the panning and tilting operations, the pan and tilt motors to be operated in opposite directions to maintain the tilt bed at a fixed tilt angle about the tilt axis as the pan platform rotates about the pan axis during the panning operation.

26. The pan-tilt unit recited in claim 25, wherein the base includes a generally cylindrical housing with a circular sidewall, the pan platform being supported on an upper edge of the sidewall.

27. The pan-tilt unit recited in claim 26, further comprising a pan bearing adjacent the upper edge of the sidewall.

28. The pan-tilt unit recited in claim 27, wherein the pan bearing includes a pair of thrust washers disposed between the upper edge of the sidewall and the pan platform.

29. The pan-tilt unit recited in claim 26, wherein the pan platform has a generally conical shape with an outer periphery that is disposed adjacent the upper edge of the sidewall.

30. The pan-tilt unit recited in claim 29, wherein the pan platform includes a tilt bed mount that is coaxially located along the pan axis, and an angled wall extending radially outward from the tilt bed mount toward the outer periphery of the pan platform, the tilt bed being rotatably mounted to the tilt bed mount.

31. The pan-tilt unit recited in claim 25, further comprising an adapter plate that is constructed and arranged to be attached to the tilt bed to mount the device to the tilt bed.

32. The pan-tilt unit recited in claim 31, wherein the adapter plate includes a fastener that is adjustable along the adapter plate to selectively position the device relative to the pan axis.

33. The pan-tilt unit recited in claim 32, wherein the fastener is slidable along a slot in the adapter plate.

34. The pan-tilt unit recited in claim 33, wherein the adapter plate includes indicia arranged adjacent the slot to position the device relative to the pan axis.

35. The pan-tilt unit recited in claim 25, further comprising a mounting plate that is supported on the base perpendicular to the pan axis, the pan and tilt motors being mounted to the mounting plate.

36. The pan-tilt unit recited in claim 25, further comprising a first bearing and a second bearing, the first bearing being mounted to the base to rotatably support a first portion of the drive shaft, the second bearing being mounted to the pan platform to rotatably support a second portion of the drive shaft.

37. The pan-tilt unit recited in claim 25, further comprising a tilt stop that is constructed and arranged to limit the rotation of the tilt bed about the tilt axis.

38. The pan-tilt unit recited in claim 37, wherein the tilt stop includes a pair of pins attached to the tilt bed on opposing sides of the pan axis that engage the drive shaft when the tilt bed is rotated to a predetermined angle about the tilt axis.

39. The pan-tilt unit recited in claim 25, further comprising a zoom controller that is constructed and arranged to communicate with a camera that is to be mounted on the tilt bed, the zoom controller to adjust camera zoom in response to an input control signal.

* * * * *